(12) United States Patent
Mehdi et al.

(10) Patent No.: US 11,052,914 B2
(45) Date of Patent: Jul. 6, 2021

(54) AUTOMATED DRIVING SYSTEMS AND CONTROL LOGIC USING MANEUVER CRITICALITY FOR VEHICLE ROUTING AND MODE ADAPTATION

(71) Applicant: GM Global Technology Operations LLC, Detroit, MI (US)

(72) Inventors: Syed B. Mehdi, Farmington Hills, MI (US); Pinaki Gupta, Novi, MI (US); Upali P. Mudalige, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 16/352,918

(22) Filed: Mar. 14, 2019

(65) Prior Publication Data

US 2020/0290619 A1    Sep. 17, 2020

(51) Int. Cl.
*B60W 30/18* (2012.01)
*G05D 1/02* (2020.01)
*B60W 40/06* (2012.01)
*B60W 40/04* (2006.01)

(52) U.S. Cl.
CPC ...... *B60W 30/18163* (2013.01); *B60W 40/04* (2013.01); *B60W 40/06* (2013.01); *G05D 1/0217* (2013.01); *B60W 2555/20* (2020.02); *G05D 2201/0213* (2013.01)

(58) Field of Classification Search
CPC .......... B60W 30/18163; B60W 40/04; B60W 40/06; B60W 2555/20; G05D 1/0217; G05D 2201/0213
See application file for complete search history.

(56) References Cited

U.S. PATENT DOCUMENTS

| 6,356,838 B1 | 3/2002 | Paul |
| 6,427,119 B1 | 7/2002 | Stefan et al. |
| 6,587,785 B2 | 7/2003 | Jijina et al. |
| 6,697,730 B2 | 2/2004 | Dickerson |
| 7,840,427 B2 | 11/2010 | O'Sullivan |

(Continued)

FOREIGN PATENT DOCUMENTS

| DE | 102014016567 A1 | 5/2016 |
| WO | 0220296 A1 | 3/2002 |

*Primary Examiner* — Thomas G Black
*Assistant Examiner* — Anthony M Gartrelle
(74) *Attorney, Agent, or Firm* — Quinn IP Law

(57) ABSTRACT

Automated driving systems, control logic, and methods execute maneuver criticality analysis to provide intelligent vehicle operation in transient driving conditions. A method for controlling an automated driving operation includes a vehicle controller receiving path plan data with location, destination, and predicted path data for a vehicle. From the received path plan data, the controller predicts an upcoming maneuver for driving the vehicle between start and goal lane segments. The vehicle controller determines a predicted route with lane segments connecting the start and goal lane segments, and segment maneuvers for moving the vehicle between the start, goal, and route lane segments. A cost value is calculated for each segment maneuver; the controller determines if a cost values exceeds a corresponding criticality value. If so, the controller commands a resident vehicle subsystem to execute a control operation associated with taking the predicted route.

20 Claims, 5 Drawing Sheets

(56) References Cited

U.S. PATENT DOCUMENTS

| | | |
|---|---|---|
| 8,170,739 B2 | 5/2012 | Lee |
| 8,364,334 B2 | 1/2013 | Au et al. |
| 8,428,843 B2 | 4/2013 | Lee et al. |
| 8,612,139 B2 | 12/2013 | Wang et al. |
| 8,725,408 B2 * | 5/2014 | Hochkirchen ........ B60W 20/12 |
| 8,849,515 B2 | 9/2014 | Moshchuk et al. |
| 9,014,915 B2 | 4/2015 | Chatterjee et al. |
| 9,079,587 B1 | 7/2015 | Rupp et al. |
| 9,099,006 B2 | 8/2015 | Mudalige et al. |
| 9,139,204 B1 | 9/2015 | Zhao et al. |
| 9,229,453 B1 | 1/2016 | Lee |
| 9,283,967 B2 | 3/2016 | Lee |
| 9,487,212 B1 | 11/2016 | Adam et al. |
| 9,517,771 B2 | 12/2016 | Attard et al. |
| 9,587,952 B1 | 3/2017 | Slusar |
| 9,815,481 B2 | 11/2017 | Goldman-Shenhar et al. |
| 9,868,443 B2 | 1/2018 | Zeng et al. |
| 9,971,945 B2 | 5/2018 | Zhao et al. |
| 9,972,206 B2 | 5/2018 | Zhao et al. |
| 2008/0046174 A1 | 2/2008 | Johnson |
| 2009/0030885 A1 | 1/2009 | DePasquale et al. |
| 2010/0228415 A1 | 9/2010 | Paul |
| 2011/0059693 A1 | 3/2011 | O'Sullivan |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0219294 A1 | 8/2013 | Goldman-Shenhar et al. |
| 2014/0011522 A1 | 1/2014 | Lin et al. |
| 2015/0345966 A1 * | 12/2015 | Meuleau ............ G01C 21/3453 |
| 2015/0353082 A1 | 12/2015 | Lee et al. |
| 2015/0353085 A1 | 12/2015 | Lee |
| 2016/0231124 A1 | 8/2016 | Nickolaou et al. |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Liu et al. |
| 2017/0021830 A1 | 1/2017 | Feldman et al. |
| 2018/0238696 A1 * | 8/2018 | Takeda ................ G01C 21/3446 |
| 2020/0249674 A1 * | 8/2020 | Dally .................. G05D 1/0088 |

* cited by examiner

AUTOMATED DRIVING SYSTEMS AND CONTROL LOGIC USING MANEUVER CRITICALITY FOR VEHICLE ROUTING AND MODE ADAPTATION

INTRODUCTION

The present disclosure relates generally to motor vehicles with navigation capabilities. More specifically, aspects of this disclosure relate to automated and autonomous vehicle driving systems with vehicle path planning and rerouting features.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is a computer-automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, and other Advanced Driver Assistance Systems (ADAS) and autonomous driving features are also available on many modern-day automobiles.

As vehicle processing, communication, and sensing capabilities continue to improve, manufacturers will persist in offering more system-automated driving capabilities with the aspiration of eventually producing fully autonomous vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous systems to enable vehicle routing with steering, lane changing, scenario planning, etc. Automated route generation systems utilize vehicle state and dynamics sensors, map and road condition data, and path prediction algorithms to provide path derivation with automated lane center and lane change forecasting. Computer-assisted rerouting techniques offer predicted alternative travel routes that may be updated, for example, based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit information associated with the vehicle's current location. Autonomous driving and advanced driver assistance systems are often able to adapt certain automated driving maneuvers based on roadway information obtained by the in-vehicle navigation system. Ad-hoc-network-based ADAS, for example, may employ GPS and mapping data in conjunction with multi-hop geocast V2V and V2I data exchanges to facilitate automated vehicle maneuvering and powertrain control. During assisted and unassisted vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving directions on a geocoded and annotated map. Such conventional approaches to route planning, while effective at determining the shortest travel distance/time to a desired destination, do not account for the most efficient routes or the most favorable routes for governing vehicle operation.

SUMMARY

Disclosed herein are automated driving systems and attendant control logic for intelligent vehicle operation in transient driving conditions, methods for constructing and methods for operating such systems, and motor vehicles with enhanced maneuver criticality analysis for executing intelligent vehicle operations. By way of example, there are presented vehicle control algorithms and automated driving system architectures that provision vehicle path planning and rerouting capabilities to circumvent high-cost, non-critical maneuvers, e.g., by taking a lower-cost alternative route. Through the foregoing control algorithms and system architectures, a vehicle may also be enabled to undertake a high-cost critical maneuver, such as maneuvering to exit at an important off-ramp, by automatically adapting a vehicle driving mode to "aggressive" to allow increased vehicle speeds, accelerations, lane changes, etc. The automated driving system may provide an advanced warning to the driver that describes the criticality of an upcoming maneuver, thus allowing the driver to take remediating action or select an alternative course of action.

Enhanced maneuver criticality analysis for executing intelligent vehicle operations may be enabled by forecasting a series of upcoming maneuver segments to negotiate a maneuver on a current route, and predicting a respective criticality value for each maneuver segment. Using the estimated criticality of each maneuver segment, the automated driving system estimates a maximum cost the vehicle may experience to execute the maneuver. For a highly critical maneuver with a maximum cost estimate that is below a vehicle-calibrated cost threshold, the automated driving system may automatically adapt a current vehicle mode and other operating parameters to allow for aggressive vehicle operation to complete the maneuver. In contrast, for an upcoming non-critical maneuver with a maximum cost estimate that exceeds the vehicle-calibrated cost threshold, the automated driving system may automatically reroute the vehicle. Prior to taking either of the foregoing actions, the automated driving system may output a visual and/or audible advisory that warns the driver of the criticality and cost estimate of an upcoming maneuver and, optionally, prompts the driver to take preemptive action or approve of the vehicle's automated response.

Attendant benefits for at least some of the disclosed concepts include intelligent driving systems, control logic, and controller-automated driving techniques that help to ensure that an autonomous vehicle or ADAS-operated vehicle does not miss critical maneuvers while operating in a default "gentle" driving mode. Likewise, an autonomous/ADAS-operated vehicle is able to dynamically reroute from a current path in order to evade high-cost, low-criticality maneuvers. ADAS and self-driving vehicle frameworks implementing disclosed maneuver criticality analysis techniques help to enhance passenger comfort while minimizing risk of collision. Enhanced maneuver criticality analysis also helps to ensure top-level automated driving performance, yielding more consistent and reliable system operation, without requiring the addition of dedicated sensors and hardware.

Aspects of the present disclosure are directed to control algorithms and computer-readable media for executing intelligent vehicle operations in transient driving conditions. In an example, a method is presented for controlling an automated driving operation of a motor vehicle. The foregoing representative method includes, in any order and in any combination with any of the above and below options and features: determining, e.g., via a resident or remote vehicle controller independently or through cooperative operation with a vehicle navigation system, path plan data including vehicle location, destination, and predicted path data for the motor vehicle; predicting, e.g., via the vehicle controller based on the received path plan data in conjunction with a resident or remote memory-stored map database, an upcoming maneuver to drive the motor vehicle from a start lane segment to a goal lane segment; determining e.g., via the vehicle controller in real-time or from the map database or a cloud computing resource service, a primary (first) predicted route including multiple (first) route lane segments cooperatively connecting the start lane segment to the goal lane segment; determining multiple (first) segment maneuvers, each of which moves the vehicle between a respective pair of the route lane segments and/or one of the route lane segments and the start or goal lane segment; determining multiple (first) cost values, each of which corresponds to a respective segment maneuver; determining if a cost value corresponding to one of the segment maneuvers is greater than a corresponding (first) criticality value; and, if not, transmitting a (first) command signal via the vehicle controller to a resident vehicle subsystem to execute a (first) control operation associated with taking the primary predicted route.

Other aspects of the present disclosure are directed to intelligent motor vehicles with enhanced maneuver criticality analysis capabilities. As used herein, the term "motor vehicle" may include any relevant vehicle platform, such as passenger vehicles (internal combustion engine (ICE), hybrid, full electric, fuel cell, etc.), commercial vehicles, industrial vehicles, tracked vehicles, off-road and all-terrain vehicles (ATV), motorcycles, etc. For purposes of this disclosure, the terms "automated" and "autonomous" may be used synonymously and interchangeably to denote vehicles with assisted and/or fully autonomous driving capabilities, including vehicle platforms that may be classified as a Society of Automotive Engineers (SAE) Level 2, 3, 4 or 5 vehicle. SAE Level 0, for example, is generally typified as "unassisted" driving that allows for vehicle-generated warnings with momentary intervention, but otherwise relies solely on human control. By comparison, SAE Level 3 allows for unassisted, partially assisted, and fully assisted driving with sufficient automation for full vehicle control while obliging driver intervention within a calibrated timeframe. At the upper end of the spectrum is Level 5 automation that altogether eliminates human intervention from vehicle driving operation, e.g., eliminating the steering wheel, throttle and brake pedals, shift knob, etc.

In an example, a motor vehicle is presented that includes a vehicle body with a vehicle powertrain (e.g., engine and/or motor, transmission, final drive, powertrain control module (PCM), etc.), a vehicle brake system (e.g., disk/drum brakes, hydraulics, brake system control module (BSCM), etc.), a steering system (e.g., drive-by-wire framework) and a network of sensing devices (e.g., radar, LIDAR, infrared, camera, GPS, automated system control module (ASCM), etc.), all of which are mounted to the vehicle body. A vehicle controller, which may be embodied as a network of controllers, is communicatively connected to the vehicle powertrain, brake system, various sensing devices, and a resident vehicle navigation system. The vehicle controller is programmed to execute memory-stored instructions to receive, estimate, identify, and/or retrieve (collectively "determine") path plan data—location, destination, and predicted path data—for the motor vehicle and, based on this received data, predict an upcoming maneuver for driving the vehicle between start and goal lane segments. The vehicle controller identifies a desired predicted route with route lane segments that connect the start and goal lane segments, and determines segment maneuvers for moving the vehicle between neighboring lane segments. A cost value is calculated for each segment maneuver; the vehicle controller then determines if any of these cost values exceeds a corresponding criticality value. If not, the vehicle controller transmits a command signal to a resident vehicle subsystem to execute a control operation associated with taking the desired predicted route.

For any of the disclosed vehicles, control systems, and methods, a vehicle controller may be further programmed to: determine an alternative (second) predicted route with multiple lane segments that connect the start and goal lane segments; determine segment maneuvers for moving the motor vehicle between respective pairs of neighboring lane segments; and determine (second) cost values corresponding to these alternative route segment maneuvers. In this instance, the first criticality value may be calculated based on cost values from both the first and second cost values. Responsive to one of the primary route cost values exceeding a corresponding criticality value, a vehicle controller may be programmed to transmit an alternative (second) command signal to a resident vehicle subsystem to execute a different (second) driving operation associated with taking the alternative predicted route. In this regard, the vehicle controller may also determine another alternate (third) predicted route with lane segments that cooperatively connect the start and goal lane segments, and segment maneuvers for connecting neighboring lane segments. The vehicle controller then determines cost values corresponding to these alternate segment maneuvers; the first criticality value may be calculated as a minimum cost function with values from the first, second, and third cost values.

For any of the disclosed vehicles, control systems, and methods, determining a predicted route may include generating a nodal diagram with each of the corresponding lane segments represented as a respective node. In this instance, determining segment maneuvers may include representing each segment maneuver as a respective connector (e.g., an arrow) that links a respective pair of nodes. As a further option, determining the cost values for select segment maneuvers may include: determining multiple finite steps for the motor vehicle to complete each segment maneuver; and determining a respective finite cost value for each finite step. In this instance, a cost value for a respective segment maneuver may be calculated as the sum of the finite cost values for the respective finite steps corresponding to that segment maneuver. The vehicle controller may also determine a current driving mode of an automated driving system of the motor; calculating a cost value for a segment maneuver may include applying a weighting factor, based on this driving mode, to one or more parameters associated with that segment maneuver.

For any of the disclosed vehicles, control systems, and methods, determining a cost value may include: determining multiple vehicle operations each suitable for completing a given segment maneuver; simulate each vehicle operation to estimate a respective operation cost value thereof; and derive a respective cost value corresponding to that segment maneuver by calculating a minimum cost function of the respective estimated operation cost values. Each cost value may be representative of a difficultly analysis for completing the corresponding segment maneuver as a function of road condition data, traffic condition data, and weather condition data.

For any of the disclosed vehicles, control systems, and methods, the resident vehicle subsystem may be embodied as an autonomous driving control module that is operable to automate driving of the motor vehicle. In this instance, the vehicle control operation may include automating driving of the motor vehicle (e.g., steering, throttle, braking, headway, maneuvering, etc.) to complete a selected predicted route to drive the motor vehicle from the start lane segment to the goal lane segment. As a further option, the resident vehicle subsystem may be embodied as an ADAS control module that is operable to automate select driving operations of the vehicle. In this instance, the control operation may include executing a controller-automated driving maneuver to complete at least a portion of the selected predicted route. As another option, the resident vehicle subsystem may be embodied as a resident vehicle navigation system with electronic input and display devices. In this instance, the vehicle control operation may include the display device displaying a predicted route contemporaneous with its corresponding criticality value, and the input device receiving a user command to determine an alternative route for driving the motor vehicle from the start lane segment to the goal lane segment.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
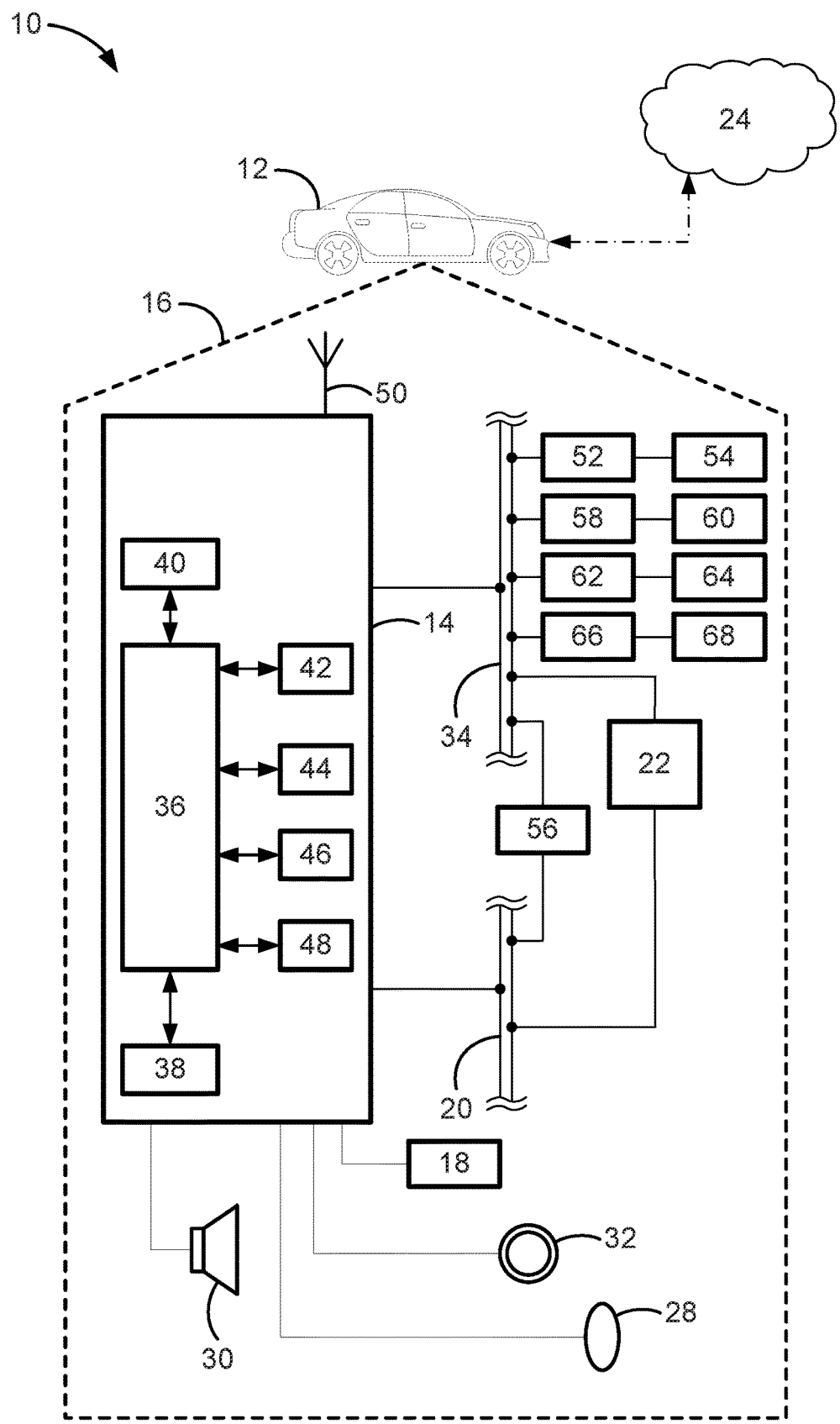
FIG. 1 is a schematic illustration of a representative motor vehicle with a network of in-vehicle controllers, sensing devices, and communication devices for executing automated driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," "generally," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more assisted or automated driving operations. The illustrated automobile 10—also referred to herein as "motor vehicle" or "vehicle" for short—is merely an exemplary application with which aspects and features of this disclosure may be practiced. In the same vein, implementation of the present concepts for the specific autonomous driving systems and operations discussed below should also be appreciated as exemplary applications of novel features disclosed herein. As such, it will be understood that aspects and features of this disclosure may be applied to other automated driving system architectures, utilized for other automated driving operations, and implemented for any logically relevant type of motor vehicle. Moreover, only select components of the automated driving systems and vehicles are shown and will be described in additional detail herein. Nevertheless, the vehicles and system architectures discussed herein may include numerous additional and alternative features, and other available peripheral components, for example, for carrying out the various methods and functions of this disclosure.

The representative vehicle 10 of FIG. 1 is originally equipped with a vehicle telecommunication and information ("telematics") unit 14 that wirelessly communicates (e.g., via cell towers, base stations, mobile switching centers, etc.) with a remotely located or "off-board" cloud computing system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, touchpads, keyboards, touchscreens, etc.). Generally, these hardware components 16 function, in part, as a human/machine interface (HMI) to enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing audio filtering, editing and analysis software. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an electronic control unit (ECU) 52, an engine control module (ECM) 54, a powertrain control module (PCM) 56, sensor interface module(s) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communications devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, electromagnetic, or light-based waves (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameter. Using data from the sensing devices 62, 64, 66, 68, the CPU 36 identifies surrounding driving conditions, determines characteristics of road surface conditions, identifies objects within a detectable range of the vehicle 10, determines attributes of the target object, such as size, relative position, angle of approach, relative speed, etc., and executes automated control maneuvers based on these executed operations.

These sensors are distributed throughout the motor vehicle 10 in operatively unobstructed positions relative to views fore and aft or on port and starboard sides of the vehicle. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

Presented are automated driving systems that assess the criticality and costs of driving maneuvers along a given path for rerouting, vehicle mode adaptation, and driver alerts. In an example, an autonomous vehicle employs enhanced maneuver criticality analysis to reroute and, thus, circumvent high-cost, non-critical maneuvers, e.g., by taking a lower cost street route to skip a difficult highway merge. The foregoing enhanced maneuver criticality analysis also enables the autonomous vehicle to take extra steps to ensure critical maneuvers are not missed, e.g., by changing a current vehicle driving mode to "aggressive" and, thus, enabling higher accelerations, higher speeds, more aggressive lane changes, etc. Automated alerts may be generated to notify the driver of the criticality and/or cost of an upcoming maneuver. A cost function may be employed to evaluate driving maneuvers as well as low-level vehicle trajectories to select a lower-cost solution.

Disclosed maneuver criticality analysis techniques identify a criticality of each maneuver in a current route and, using the criticality of each maneuver, ascertain a maximum cost the autonomous vehicle may experience while executing that maneuver. Vehicle mode and other vehicle operating parameters may be adapted, e.g., from a default "comfort" mode to a sport "aggressive" mode, or vice versa, in anticipation of an upcoming maneuver based on a cost and criticality analysis. For example, during trajectory generation, a maximum allowable lateral acceleration value may be increased to execute a critical maneuver. In so doing, the vehicle is enabled to incur high accelerations rather than failing to find a suitable trajectory and abandoning a critical maneuver. Conversely, a current vehicle driving mode may be adjusted to a default "comfort" mode and the vehicle rerouted if an estimated cost required to execute an upcoming maneuver is higher than allowed. Each operating made may restrict autonomous vehicle operation to a respective set of hard limits, including maximum forward, lateral and turning speeds, accelerations, headway distances, etc., as well as different cost functions of speed, acceleration, headway distance, etc.

Figure 2A:
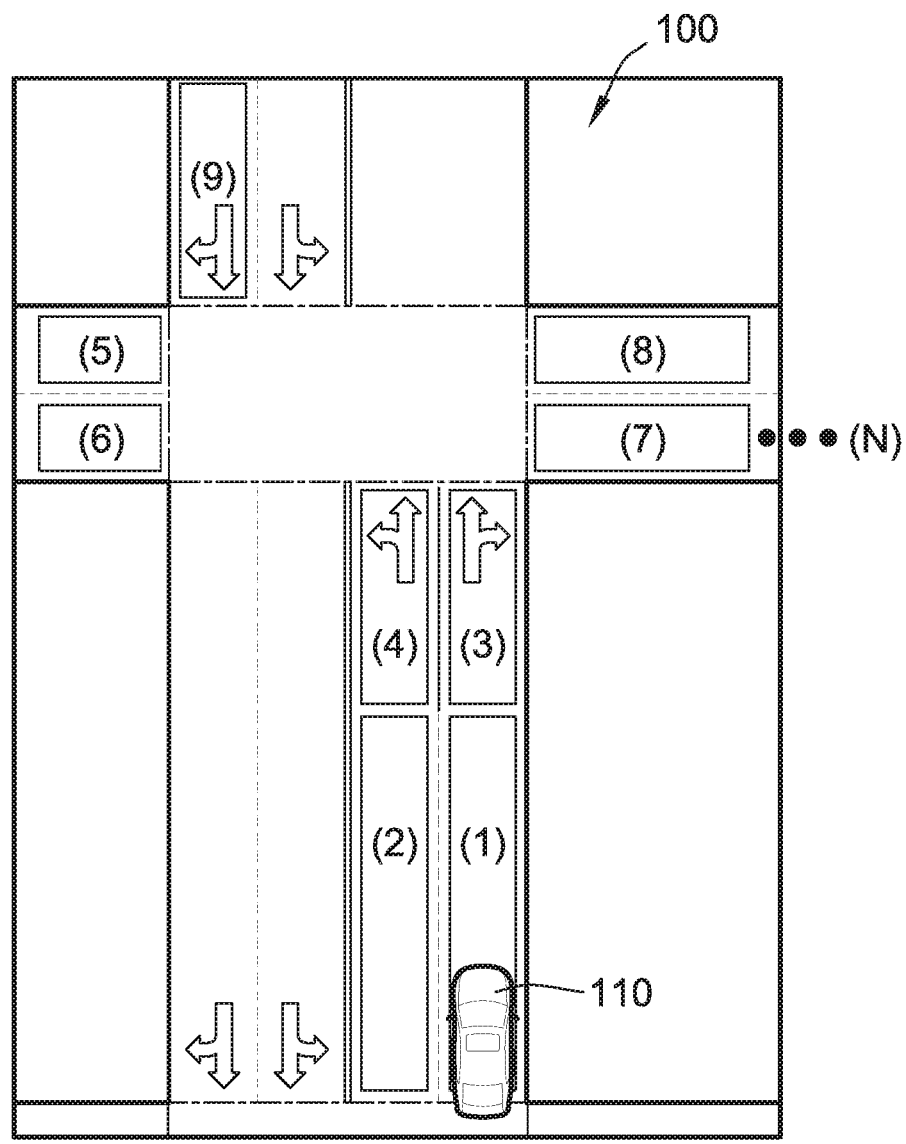
FIG. 2A is a plan-view illustration of a representative roadway intersection portraying a host vehicle executing an enhanced maneuver criticality analysis for a driving maneuver along a planned route in accordance with aspects of the present disclosure.

Turning next to FIG. 2A, a representative host vehicle 110 is shown performing an enhanced maneuver criticality analysis for completing a desired driving maneuver (a left-hand turn) at a roadway intersection 100 along a planned route. In accord with the illustrated example, a memory-stored path-planning algorithm is executed via host vehicle 110 to conduct a graph search to find an optimal route from a starting lane segment (1) to a goal lane segment (5). As part of the path-planning algorithm, each lane of the planned route at the roadway intersection 100 is divided into distinct lane segments; there are nine lane segments, respectively labelled (1)-(9), in FIG. 2A. Lane segment derivation may comprise retrieving lane-level segment data for the roadway intersection 100 from a remote geolocation mapping service (e.g., cloud computing system 24 of FIG. 1); alternatively, lane segmentation may be performed in real-time by the host vehicle 110 or a remote mapping service communicating with the host vehicle 110. It should be appreciated that the total number and individual sizes, locations and orientations of the lane segments may vary from scenario to scenario.

Figure 2B:
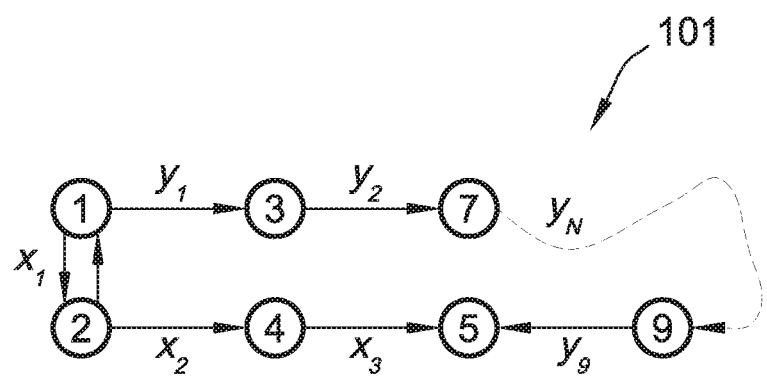
FIG. 2B is a representative node diagram for performing a graph search to find an optimal route from a starting lane segment to a goal lane segment for the driving maneuver of FIG. 2A.

FIG. 2B illustrates a representative node diagram 101 for performing a graph search to find an optimal route from the starting lane segment (1) to the goal lane segment (5) for the driving maneuver of FIG. 2A. Each node in the diagram 101 of FIG. 2B represents one of the lane segments (1)-(9) from FIG. 2A; the nodes are labelled accordingly. The arrows of FIG. 2B that connect individual pairs of neighboring lane segment nodes each corresponds to a driving maneuver carried out by the host vehicle 110 to move between those neighboring segments. Note, the dashed arrow connecting lane segments (7) and (9) in FIG. 2B indicates the vehicle 110 traversing lane segments and performing corresponding segment maneuvers outside the view presented in FIG. 2A. Although differing in appearance, the host vehicle 110 of FIG. 2A may take on any of the options and alternatives described above and below with respect to the other disclosed vehicles 10 and 210 of FIGS. 1 and 3A, and vice versa.

In performing the maneuver criticality analysis, a cost value is determined for each segment-to-segment maneuver. For at least some implementations, a cost value may be derived in terms of the individual low-level steps—or "finite steps"—performed by the host vehicle 110 to complete that maneuver. Each low-level step may be typified by a finite sequence of actions that the vehicle 110 performs at the roadway intersection 100, such as lane keep, lane change, stop for red light/stop sign, decelerate/accelerate, etc. For example, a first cost value $cost(x_1)$ may represent the complexity of host vehicle 110 performing a lane-change maneuver $x_1$ to transition from lane segment (1) to lane segment (2) given current estimates of road conditions, traffic conditions, weather conditions etc. By comparison, a second cost value cost($y_1$) may represent the complexity of the host vehicle 110 performing a forward maneuver $y_1$ to transition from lane segment (1) to lane segment (3) given current estimates of road conditions, traffic conditions, weather conditions, current light signal state, etc.

Based on current estimates of each cost value for each segment maneuver, where one or more values may be ascertained from offline information, the automated driving system seeks to identify the best route from the start lane segment (1) to the goal lane segment (5). By way of example, and not limitation, a total (first) cost value, designated as cost($x_{tot}$), for the primary (first) predicted route—lane segments (2) and (4) connecting start and goal segments (1) and (5)—may be calculated as:

$$\text{cost}(x_{tot}) = \text{cost}(x_1) + C$$

where C is the mathematical sum of all cost values of all segment maneuvers after the first segment maneuver $x_1$ to reach the goal lane segment (5). In FIG. 2A, C=cost($x_2$)+cost($x_3$). In the same vein, a total (second) cost value, designated as cost($y_{tot}$), for an alternative (second) predicted route—lane segments (3), (7) . . . (N), and (9) connecting start and goal segments (1) and (5)—may be calculated as:

$$\text{cost}(y_{tot}) = \text{cost}(y_1) + D - C$$

where D is the mathematical sum of all cost values of all segment maneuvers after the first segment maneuver $y_1$ to reach the goal lane segment (5). In FIG. 2A, D=cost($y_2$)+ . . . cost($y_N$)+cost($y_9$). A criticality value for the first segment maneuver $x_1$, designated as criticality(x), may be calculated as:

$$\text{criticality}(x_1) = \text{cost}(y_1) + D - C$$

In this example, the host vehicle 100 may execute corresponding vehicle operations to follow the alternative predicted route if the cost value cost($x_1$) of the first segment maneuver $x_1$ is greater than the criticality value criticality($x_1$) of that maneuver $x_1$. The above criticality analysis and attendant cost comparison may be carried out for each segment-to-segment maneuver for the primary predicted route.

If a cost value corresponding to one of the segment maneuvers is greater than its associated criticality value, an alternate route may be desired. Finding an alternative "second best" route may comprise removing that high-cost maneuver, and its corresponding arrow connector, from the node diagram 101; once removed, an alternative segment maneuver is selected, such as forward maneuver $y_1$ to transition from lane segment (1) to lane segment (3), and the maneuver criticality analysis is performed for the newly chosen maneuver. If the cost value cost($y_1$) of the forward maneuver $y_1$ does not exceed the criticality value criticality($y_1$) of that maneuver $y_1$, the next segment maneuver in the alternate route may be analyzed. In general, the automated driving system compares the cost of the "best" route with the cost of the "second best" route; the cost difference between the two routes determines how much maneuver cost is justified to finish a given maneuver.

In many instances, there may be more than one alternate route available for reaching a desired goal lane segment and, thus, completing a desired driving maneuver. As an extension of the left-hand turn driving maneuver example of FIG. 2A, the host vehicle 110 may be traveling in a center lane segment (2) (doubling as the start lane segment), which is flanked on starboard and port sides thereof by dedicated right-hand turn only and left-hand turn only lane segments (1) and (3), respectively. The host vehicle 110 may remain in the center lane segment (2), pass straight through the intersection, and connect with lane segment (6). Alternatively, the host vehicle 110 may enter the right-hand turn only lane segment (1), make a right turn at the intersection, and connect with lane segment (4). The more direct and, thus, desired route, would be for the host vehicle 110 to enter the left-hand turn only lane segment (3), make a left turn at the intersection, and connect with goal lane segment (7). In this example, the maneuver criticality analysis may be represented as:

$$\text{cost}(\text{best route}_{2 \to 3 \to 7}) = \text{cost}(x_1) + C$$

$$\text{cost}(2^{nd}\text{-best route}_{2 \to 6 \ldots \to 7}) = \text{cost}(y_1) + D$$

$$\text{cost}(3^{rd}\text{-best route}_{2 \to 1 \to 4 \ldots \to 7}) = \text{cost}(z_1) + E$$

In this instance, a criticality value for a segment maneuver along the primary "best" route may be calculated as a minimum cost function with cost values from the "second best" and "third best" routes, where:

$$\text{criticality}(x) = \min(\text{cost}(y) + D - C, \text{cost}(z) + E - C)$$

Once again, the automated driving system may decide to skip segment maneuver x if cost(x)>criticality(x).

For many maneuver criticality evaluations, a resident vehicle controller or a dedicated control module of the automated driving system may apply weighting factors to increase or decrease the associated cost of certain finite steps of a segment maneuver depending on a current driving mode of a host vehicle. Put another way, after determining a driving mode of the vehicle, the respective cost value for a segment maneuver may be calculated by applying a driving-mode-based weighting factor to one or more parameters associated with that segment maneuver. In effect, the individual cost values of the segment maneuvers not only depend on the specifics of the maneuver but also on the driving mode selected by the user. For example, if the current driving mode is set to a default "gentle" driving mode, attendant costs for acceleration or deceleration maneuvers with magnitudes larger than a calibrated threshold g-force may be increased by a weighting factor of five (e.g., cost(decel)=$5 \times F_{decel}^3$). By comparison, if the current driving mode is set to a sport "aggressive" driving mode, no additional weighting factor is applied (e.g., cost(deceleration)=$\text{deceleration}^3$).

At least some of the disclosed maneuver criticality evaluations may apply predefined penalties to the cost of certain finite steps of a segment maneuver depending on an occupant-selected driving mode of a host vehicle. For instance, a cost associated with the automated driving system automatically adapting driving mode to the sport driving mode when an occupant has selected the comfort driving mode may be set at a predefined penalty (e.g., 100). No such penalty would be applied if the occupant has selected the aggressive sport driving mode. On the other hand, if an occupant has selected an "extra comfort" driving mode, the penalty value for adapting driving mode to the sport driving mode may be set to an extraordinarily large value (e.g., one million) whereby the automated driving system is restricted from making such a change without occupant input.

Aspects of the disclosed concepts may assess separate cost values for ancillary parameters related to a host vehicle performing a given maneuver. As an example, an autonomous host vehicle may attempt to exit a freeway at an upcoming off-ramp by performing a lane change maneuver into a dedicated off-ramp lane. Prior to executing the lane change maneuver, the host vehicle is driving in front of a large truck while two target vehicles are passing on the right at high speeds while also attempting to exit using the off-ramp lane. Under current driving and traffic conditions, this maneuver may be performed in a variety of manners: method 1—slow host vehicle to allow both target vehicles to pass before host vehicle makes a lane change into the dedicated off-ramp lane; method 2—attempt to merge host vehicle into the dedicated off-ramp lane between the two closely aligned target vehicles; and method 3—accelerate the host vehicle to make a lane change into the dedicated off-ramp lane in front of the two target vehicles. In this example, the cost of each method may be determined as follows:

$$\text{cost(method 1)}=\text{cost(deceleration)}+\text{cost(deceleration of the following truck)}+\text{cost(smooth lane crossing)}$$

$$\text{cost(method 2)}=\text{infinity(not allowed)}$$

$$\text{cost(method 3)}=\text{cost(change mode to aggressive for 2 sec)}*+\text{cost(aggressive acceleration)}+\text{cost(deceleration)}+\text{cost(hasty lane crossing)}$$

A final cost of the lane change maneuver may be calculated as: cost(lane change)=min(cost(method 1), cost(method 2), cost(method 3)).

Figure 3A:
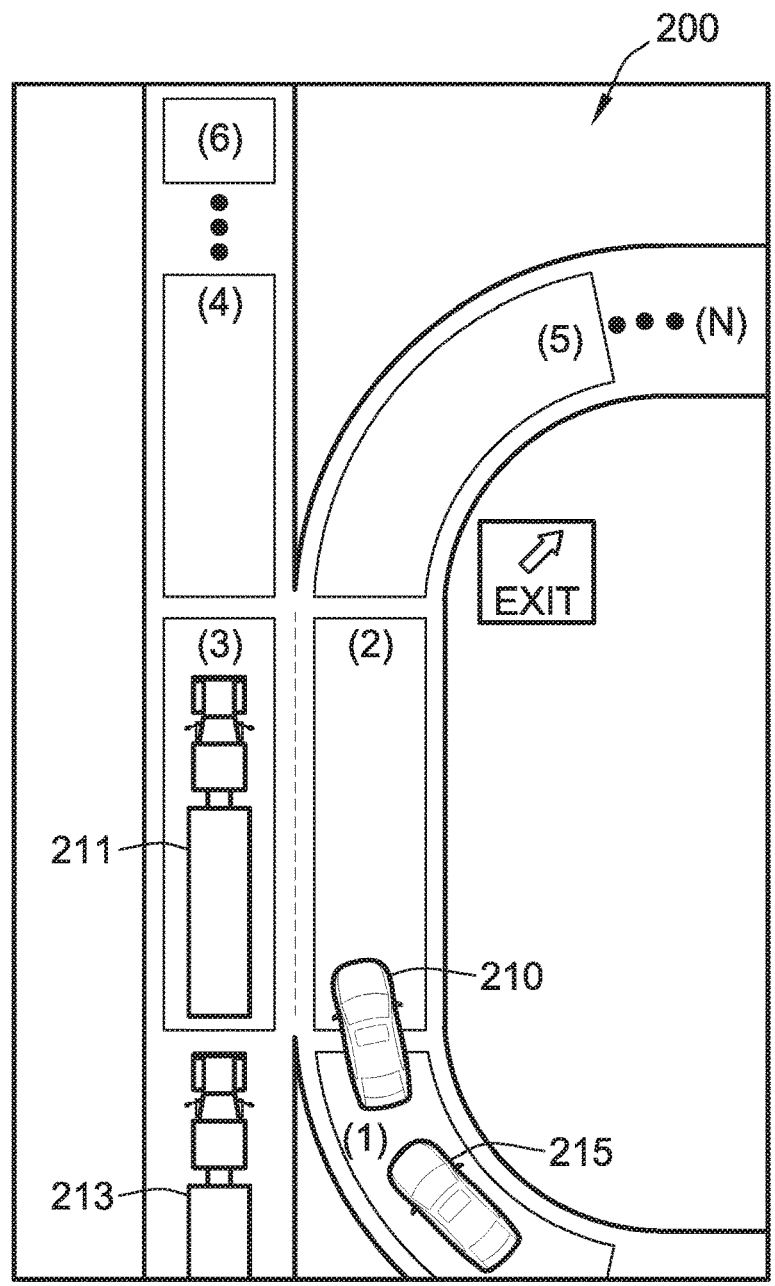
FIG. 3A is a plan-view illustration of representative highway intersection portraying a host vehicle executing an enhanced maneuver criticality analysis for a driving maneuver at an on-ramp/off-ramp interchange along a planned route in accordance with aspects of the present disclosure.
Figure 3B:
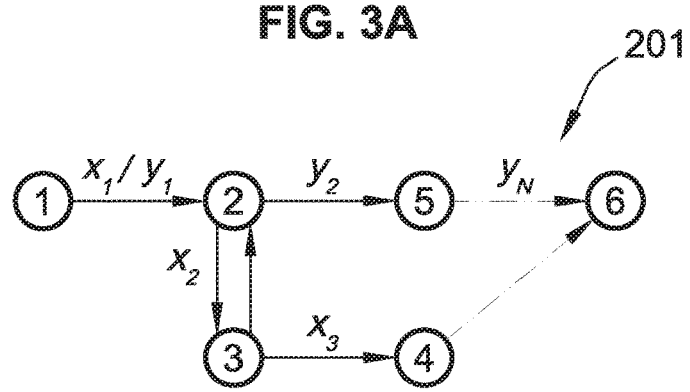
FIG. 3B is another representative node diagram for performing a graph search to find an optimal route from a starting lane segment to a goal lane segment for the driving maneuver of FIG. 3A.

With reference to FIG. 3A, a representative autonomous vehicle 210 is shown performing an enhanced maneuver criticality analysis for completing a desired driving maneuver (a lane merge onto a highway) at a highway intersection 200 along a planned route. In accord with the illustrated example, a memory-stored path-planning algorithm is executed via autonomous vehicle 210 to conduct a graph search to find an optimal route from a starting lane segment (1) to a goal lane segment (6). As part of the path-planning algorithm, each lane at the highway on-ramp intersection 200 is divided into distinct lane segments; there are six lane segments, respectively labelled (1)-(6), shown in FIG. 3A. FIG. 3B illustrates a representative node diagram 201 for performing a graph search to find an optimal route from the starting lane segment (1) to the goal lane segment (6) for the driving maneuver of FIG. 3A. Each node in the diagram 201 of FIG. 3B represents one of the lane segments (1)-(6) from FIG. 3A. The arrows of FIG. 2B that interconnect neighboring lane segment nodes each corresponds to a driving maneuver carried out by the vehicle 210 to move between those neighboring segments. Similar to FIG. 2A, the dashed arrow connecting lane segments (4) and (6) and the dashed arrow connecting lane segments (4) and (6) in FIG. 3B indicates the vehicle 210 traversing lane segments and performing segment maneuvers outside the view presented in FIG. 3A.

According to the representative implementation presented in FIG. 3A, higher-cost individual maneuvers resulting from aggressive finite steps and nuisance to third-party vehicles in nearby traffic will be tolerated if a total cost associated with an alternate "second-best" route is significantly higher than a total cost associated with a primary "best" route. An example may include an alternate route in which the autonomous vehicle 210 resolves to abandon the desired lane merge onto the highway, takes the exit ramp (lane segment (5)), and is then forced to endure considerably more maneuvers to traverse significantly more lane segments to reach the goal lane segment (6). In this case, the alternate predicted route is costlier than the primary predicted route; as such, the vehicle 210 may automatically shift into an aggressive sport driving mode to enable high forward and lateral accelerations that will facilitate the desired merge. Prior to executing the high-cost complex maneuver, the driver/occupant may be informed and, optionally, prompted to assent, intervene, or override the automated driving system's decision.

On the other hand, performing a lane change maneuver from lane segment (2) to lane segment (3) in FIG. 3A may drastically increase the total cost value of the primary predicted route, for example, due to fluctuations in traffic, weather, road conditions, etc. A pair of tractor-trailer trucks 211 and 213 are shown obstructing the host vehicle's 210 merge from lane segment (2) to lane segment (3). At the same time, a trailing target vehicle 215 is preventing the autonomous vehicle 210 from slowing down to allow the trucks 211, 213 to pass and executing the desired segment-to-segment maneuver. If excessive costs are sustained in order to maintain the primary predicted route, the driver/occupant may be informed accordingly (e.g., via display device 18 or audio speaker 30 of telematics unit 14 of FIG. 1) and the alternate route may be selected to instead take the exit at lane segment (5). If the alternate route is chosen, the passenger (in an SAE Level 4 or Level 5 autonomous vehicle) or the driver (in an SAE Level 2 or Level 3 automated vehicle) may be informed of why the route has been changed.

Transient driving conditions may unexpectedly increase the cost value associated with one or more segment maneuvers, which in turn drives up the associated cost of a predicted route under evaluation. For instance, a segment maneuver cost associated with maintaining a primary predicted route may become high if the host vehicle approaches a forward target vehicle that is driving excessively slow and, thus, is blocking the lane without an opportunity to pass. If, after updating the maneuver criticality analysis, the increased total cost value is within an allowed cost range, the autonomous vehicle will continue with the primary route. Contrariwise, the autonomous vehicle may redirect to an alternate secondary route that will eventually reach a desired vehicle destination through a different set of roads. If an alternate predicted route costs significantly more than a primary predicted route, the driver/occupant may be given a visual, audible, and/or physical cue (e.g., via a haptic transducer embedded in a vehicle seat) prompting the driver/occupant to take immediate action to complete the primary route. In the same vein, if the primary route costs significantly more than the alternate route, the driver/occupant may be given a cue prompting the driver/occupant to take immediate action to complete the alternate route.

Figure 4:
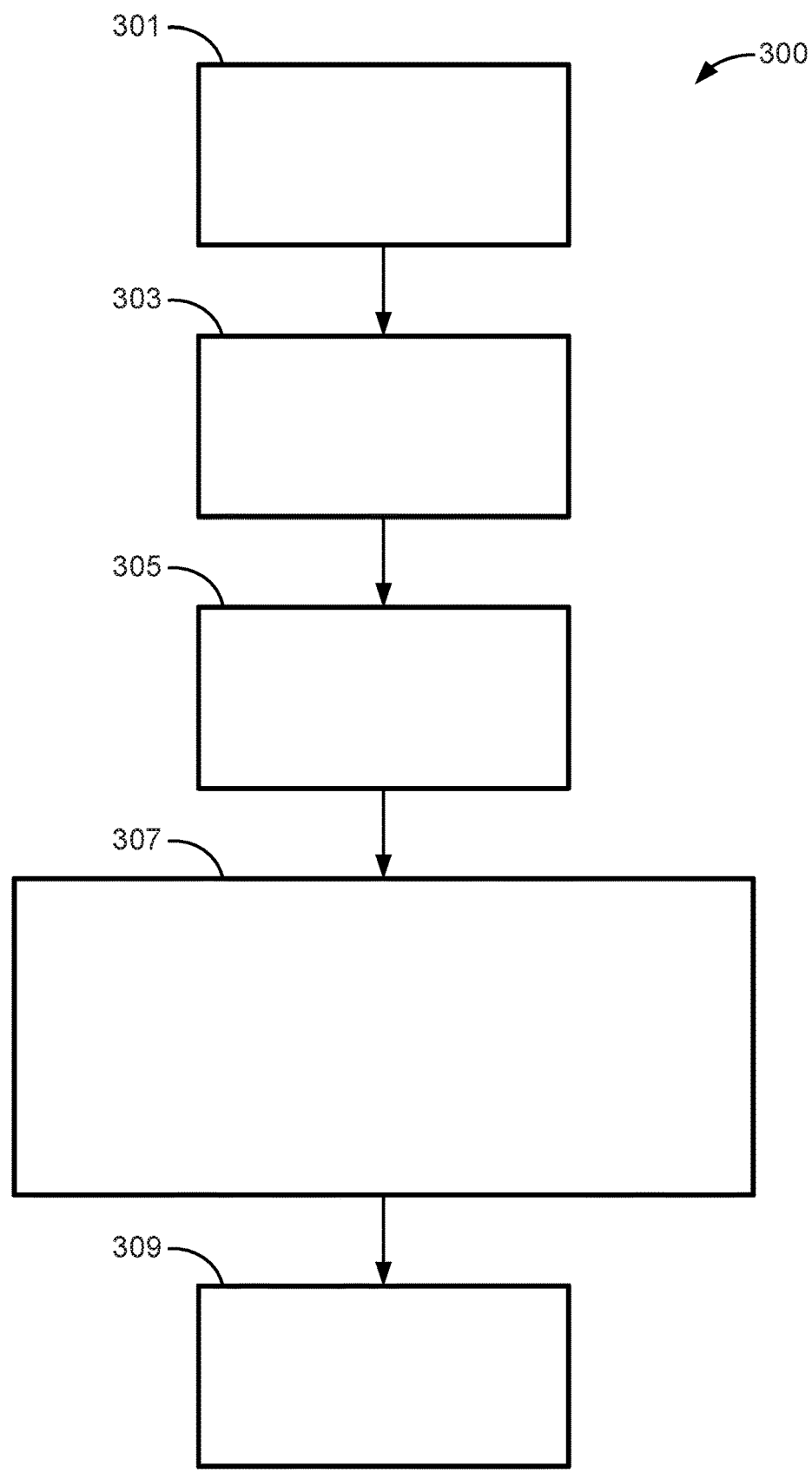
FIG. 4 is a flowchart illustrating a representative cost calculation algorithm of an enhanced maneuver criticality protocol for executing an intelligent vehicle operation, which may correspond to memory-stored instructions executed by onboard and/or remote control-logic circuitry, programmable electronic control unit, or other computer-based device or network of devices in accord with aspects of the disclosed concepts.

With reference now to the flowchart of FIG. 4, an improved method or control strategy for conducting a segment maneuver cost calculation of as part of a maneuver criticality protocol for executing an intelligent vehicle operation of a motor vehicle, such as vehicles 10, 110 and 210 of FIGS. 1, 2A and 3A, is generally described at 300 in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by a resident or remote controller, processing unit, control logic circuit, or other module, device and/or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 300 begins at process block 301 with memory-stored, processor-executable instructions to identify a respective list of vehicle operations for performing each segment maneuver in a predicted route. Depending on a particular driving maneuver, the attendant list of vehicle operations may be created in real-time, e.g., based on data generated by the networked sensors of FIG. 1, or may be retrieved from a database or memory device containing a catalogue of predetermined methods for previously analyzed maneuvers. For instance, to execute a segment-to-segment lane change maneuver, one or more operations in a corresponding list of vehicle operations may be based on sensed road conditions, traffic density, gaps in traffic in a target lane, etc. As a point of comparison, for a "proceed forward through a (yellow) traffic light" maneuver, a corresponding list of vehicle operations may include "stop and wait for green light" and "proceed through light at current speed" and "accelerate to increase speed through light."

After listing available operations in which a given segment maneuver may be performed, process block 303 instructs the vehicle controller to employ one or more simulation techniques that model future vehicle operation for a constrained window of time to calculate an operation cost value for each vehicle operation on the list. By way of clarification, and not limitation, given current measurements and/or estimates of respective positions, orientations, and speeds of nearby target vehicles, in conjunction with available historical data for related variables, a host vehicle is able to simulate movement of each target vehicle and thereby predict their future positions, orientations, and speeds. Similarly, for a given vehicle operation employed to perform a maneuver, the host vehicle employs comparable simulation techniques to predict a trajectory and related operation parameters for completing the action. The cost to perform a segment maneuver using a selected "method" may be further based on related factors, such as headway and trailing distances to nearby target vehicles, estimated forward and lateral accelerations, etc. These simulation techniques may be used to predict the time-based evolution of gap length and center location of a gap between two target vehicles passing in a target lane.

Method 300 of FIG. 4 continues to process block 305 and determines, for each vehicle operation, an associated temporal parameter for completing that vehicle operation. Continuing with the above example, a host vehicle is attempting a lane change maneuver from a current (right) lane into a target (left) lane while multiple target vehicles are about to overtake and pass the host vehicle in the target lane. Prior to carrying out the desired maneuver, the host vehicle may calculate, for each gap between each pair of leading-trailing target vehicles in the target lane, a (suboptimal or optimal) time instant at which the host vehicle may move into the respective gap and thereby execute the lane change maneuver. The cost of the lane change maneuver for a gap i may be calculated at process block 307 as the mathematical sum of: cost of lane keep until distance decided to perform the lane change; change of mode to aggressive, if needed; acceleration/deceleration to approach the gap; cost of lane change (smooth or aggressive) based on time available to finish the lane change; and cost of acceleration/deceleration needed to approach steady speed. At process block 309, the overall cost of a given segment maneuver may be calculated as minimum cost function of the listed vehicle operation.

Figure 5:
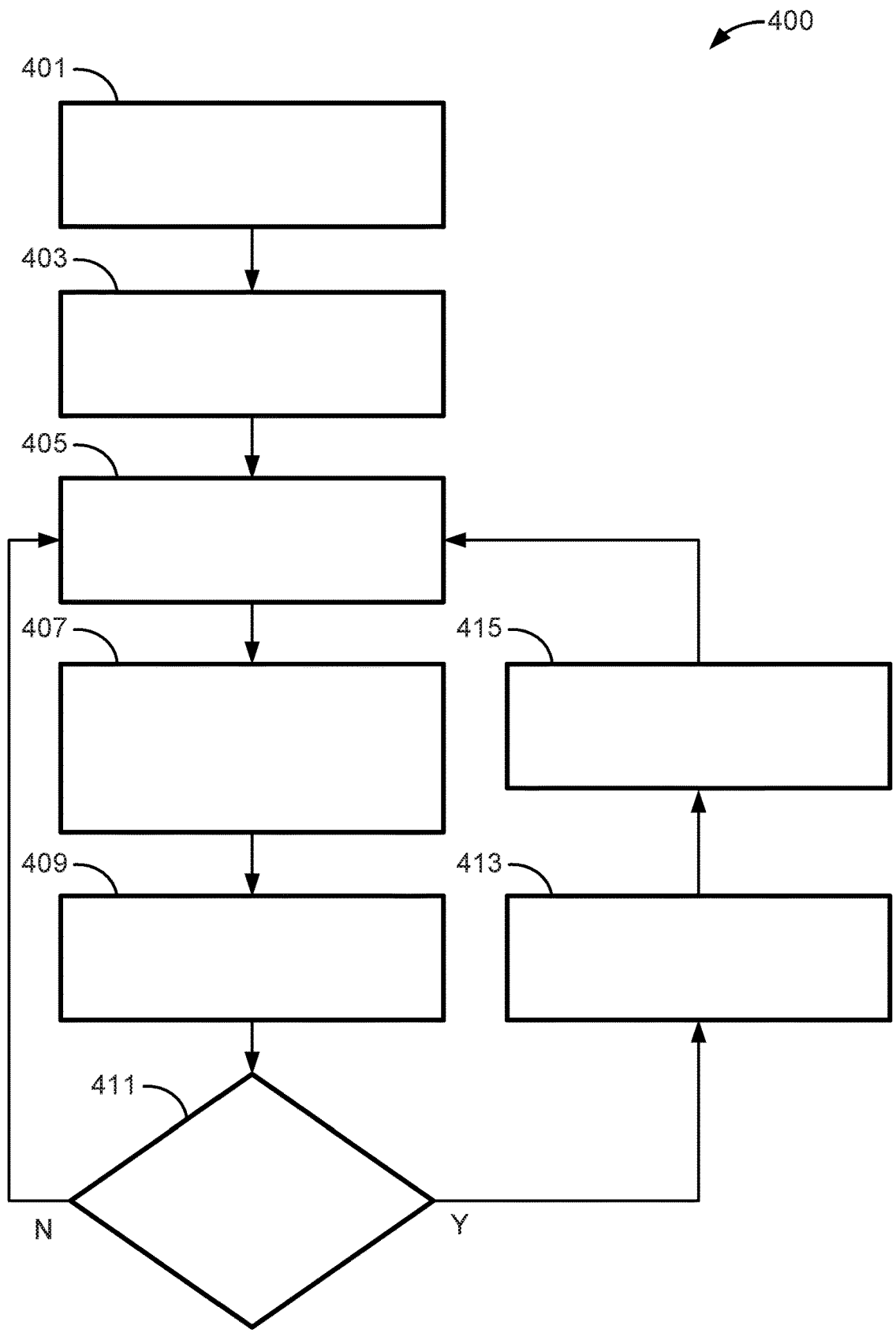
FIG. 5 is a flowchart illustrating a representative reroute planning algorithm of an enhanced maneuver criticality protocol for executing an intelligent vehicle operation, which may correspond to memory-stored instructions executed by onboard and/or remote control-logic circuitry, programmable electronic control unit, or other computer-based device or network of devices in accord with aspects of the disclosed concepts.

With reference now to the flowchart of FIG. 4, an improved method or control strategy for conducting a cost calculation as part of a maneuver criticality protocol for executing an intelligent vehicle operation of a motor vehicle, such as vehicles 10, 110 and 210 of FIGS. 1, 2A and 3A, is generally described at 400 in accordance with aspects of the present disclosure. Some or all of the operations illustrated in FIG. 5 and described in further detail below may be representative of an algorithm that corresponds to processor-executable instructions that may be stored, for example, in main or auxiliary or remote memory, and executed, for example, by a resident or remote controller, processing unit, control logic circuit, or other module, device and/or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

At process block 401, a vehicle controller of a motor vehicle, such as telematics CPU 36 of vehicle 10 in FIG. 1, receives, estimates, identifies, and/or retrieves (collectively "determines") path plan data for a current trip of a host vehicle. Path plan data may comprise any real-time, crowd-sourced, and/or historical data suitable for completing the current trip, such as a vehicle origin or real-time position (collectively "location"), an intermittent or final vehicle stop (collectively "destination"), and a predicted path traversing from vehicle location to destination. For at least some embodiments, a desired origin and/or destination may be input by a vehicle occupant, e.g., via any of the electronic input devices discussed above with respect to FIG. 1. Contemporaneous with or subsequent to establishing a predicted path for the current trip, the method 400 forecasts one or more upcoming maneuvers that will be required to complete the current trip. This may include flagging any potentially high-cost maneuvers, including respective start and goal lane segments for each said maneuver. At process block 403, the host vehicle's automated driving system predicts a primary (first) route for completing an upcoming maneuver, e.g., using the graph search method described above. Using a similar process, one or more (first, second, third, . . . ) alternate routes for reaching the goal lane segment are predicted at process block 405.

With continuing reference to FIG. 4, the method proceeds to process block 407 and determines cost values for the various segment maneuvers that collectively define the predicted routes identified at process blocks 403 and 405. A respective cost value may be calculated in any of the manners set forth herein. In addition, one or more of the individual cost values for these predicted routes may be updated in real-time based on the most up-to-date scenario and traffic information. Continuing to process block 409, the method 400 provides instructions to determine a respective criticality value for any segment-to-segment driving maneuver under analysis. Like the segment maneuver cost values, criticality values may be updated in real-time to reflect changes in driving scenario, traffic, weather, and/or road surface conditions.

Decision block 411 evaluates, for one or more of the segment maneuvers in a given the route, if the cost value for that maneuver exceeds a corresponding criticality value. For at least some implementations, a fixed calibrated parameter c may be introduced into the analysis of block 411 to help ensure a host vehicle does not immediately switch to an alternate route upon concluding a current/primary route is too costly. By way of non-limiting example, a cost estimate may depend on "noisy" estimates of evaluated parameters; consequently, the cost value itself may be noisy. Parameter c helps to ensure that a host vehicle only diverges from a given route once a cost of a maneuver on that route is measurably greater than the criticality and, thus, is not just due to instantaneous noise in the estimate. If the cost value of a particular segment maneuver for a given predicted route is not greater than its criticality value (or criticality value plus fixed calibrated parameter ε) (Block 411=NO), the method 400 may temporarily terminate or may return to process block 403 and run in a continuous loop.

Upon determining that the cost value of a segment maneuver, such as segment maneuver x of FIG. 2A or 3A, is greater than its criticality value plus the fixed calibrated parameter c (Block 411=YES), method 400 proceeds to process block 413 and provides memory-stored, processor-executable instructions to set the primary predicted route as the lowest-cost route from the list of available routes found for maneuver x. From there, method 400 communicates the criticality of the upcoming maneuver to the driver at process block 415, e.g., using visual/audio/haptic cues. It may be desirable, that process block 415 be executed during at least non-autonomous driving modes. Process block 415 may be accompanied by instructions to transmit one or more command signals to a resident vehicle subsystem, such as resident vehicle navigation or brake and steering, to execute one or more control operations associated with taking the lowest-cost route.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling an automated driving operation of a motor vehicle, the method comprising:
   determining, via a vehicle controller of the motor vehicle, path plan data including a vehicle location, a vehicle destination, and a predicted path for the motor vehicle;
   predicting, via the vehicle controller based on the received path plan data, an upcoming maneuver to drive the motor vehicle from a start lane segment to a goal lane segment;
   determining a first predicted route including multiple first lane segments connecting the start lane segment to the goal lane segment;
   determining a second predicted route including multiple second lane segments connecting the start lane segment to the goal lane segment;
   determining multiple first segment maneuvers each moving the motor vehicle between a respective pair of the start lane segment, goal lane segment, and/or first lane segments;
   determining multiple second segment maneuvers each moving the motor vehicle between a respective pair of the start lane segment, goal lane segment, and/or second lane segments;
   determining multiple first cost values each corresponding to a respective one of the first segment maneuvers and multiple second cost values each corresponding to a respective one of the second segment maneuvers;
   determining a first criticality value based on cost values from the first cost values and the second cost values;
   determining if at least one of the first cost values corresponding to at least one of the first segment maneuvers is greater than the first criticality value; and
   transmitting, via the vehicle controller responsive to the at least one of the first cost values not being greater than the first criticality value, a first command signal to a resident vehicle subsystem to execute a first control operation associated with taking the first predicted route,
   wherein the first criticality value is calculated as criticality$(x)$=cost$(y)$+D−C, where criticality$(x)$ is a criticality value of the at least one of the first segment maneuvers x corresponding to the at least one of the cost values cost$(x)$; cost$(y)$ is a respective one of the second cost values corresponding to a second segment maneuver y;

C is a first sum of all of the first cost values of the first segment maneuvers after the first segment maneuver x; and D is a second sum of all of the second cost values of the second segment maneuvers after the segment maneuver y.

2. The method of claim 1, further comprising transmitting, via the vehicle controller responsive to the at least one of the first cost values being greater than the first criticality value, a second command signal to the resident vehicle subsystem to execute a second driving operation associated with taking the second predicted route.

3. The method of claim 1, further comprising:
determining a third predicted route including multiple third lane segments connecting the start lane segment to the goal lane segment;
determining multiple third segment maneuvers each moving the vehicle between a respective pair of the start lane segment, goal lane segment, and/or third lane segments; and
determining multiple third cost values each corresponding to a respective one of the third segment maneuvers,
wherein determining the first criticality value includes calculating a minimum cost function with values from the first cost values, second cost values, and third cost values.

4. The method of claim 3, further comprising:
determining, responsive to the at least one of the first cost values being greater than the first criticality value, if at least one of the second cost values corresponding to at least one of the second segment maneuvers is greater than a second criticality value; and
transmitting, via the vehicle controller responsive to the at least one of the second cost values being greater than the second criticality value, a third command signal to the resident vehicle subsystem to execute a third driving operation associated with taking the third predicted route.

5. The method of claim 1, wherein:
determining the first predicted route includes generating a nodal diagram with each of the first lane segments represented as a respective node; and
determining the first segment maneuvers includes representing each of the first segment maneuvers as a respective connector linking the respective pair of the nodes.

6. The method of claim 1, wherein determining the multiple first cost values includes:
determining a respective plurality of finite steps for the motor vehicle to complete each of the first segment maneuvers; and
determining a respective finite cost value for each of the finite steps, wherein the first cost value for a respective one of the first segment maneuvers is a sum of the finite cost values for the respective plurality of finite steps corresponding to the first segment maneuver.

7. The method of claim 1, further comprising determining a driving mode of an automated driving system of the motor vehicle, wherein determining the respective first cost value for one of the first segment maneuvers includes applying a weighting factor based on the driving mode to one or more parameters associated with the first segment maneuver.

8. The method of claim 1, wherein determining the multiple first cost values includes:
determining a respective plurality of vehicle operations for completing each of the first segment maneuvers;
simulate each of the vehicle operations to estimate a respective operation cost value thereof; and
deriving the respective first cost value corresponding to one of the first segment maneuvers by calculating a minimum cost function of the respective estimated operation cost values.

9. The method of claim 1, wherein each of the first cost values represents a difficultly analysis of completing the corresponding first segment maneuver as a function of road condition data, traffic condition data, and weather condition data.

10. The method of claim 1, wherein the resident vehicle subsystem includes an autonomous driving control module operable to automate driving of the motor vehicle, the first control operation including automating driving of the motor vehicle to complete the first predicted route to drive the motor vehicle from the start lane segment to the goal lane segment.

11. The method of claim 1, wherein the resident vehicle subsystem includes an Advanced Driver Assistance System control module operable to automate driving of the motor vehicle, the first control operation including executing a driving maneuver to complete at least a portion of the first predicted route.

12. The method of claim 1, wherein the resident vehicle subsystem includes a vehicle navigation system with an input device and a display device, the first control operation including:
displaying, via the display device, an indication of the first predicted route contemporaneous with an indication of the first criticality value; and
receiving, via the input device, a user command to determine a second predicted route for driving the motor vehicle from the start lane segment to the goal lane segment.

13. A motor vehicle comprising:
a vehicle body;
a plurality of road wheels attached to the vehicle body;
a prime mover attached to the vehicle body and configured to drive at least one of the road wheels and thereby propel the motor vehicle;
a vehicle navigation system attached to the vehicle body and including an input device and an electronic display device; and
a vehicle controller communicatively connected to the vehicle navigation system, the vehicle controller being programmed to:
determine path plan data including a vehicle location, a vehicle destination, and a predicted path for the motor vehicle;
predict, based on the received path plan data, an upcoming maneuver to drive the motor vehicle from a start lane segment to a goal lane segment;
determine a first predicted route including multiple first lane segments connecting the start lane segment to the goal lane segment;
determine multiple first segment maneuvers each moving the motor vehicle between a respective pair of the start lane segment, goal lane segment, and/or first lane segments;
determine multiple first cost values each corresponding to a respective one of the first segment maneuvers;
determine a second predicted route including multiple second lane segments connecting the start lane segment to the goal lane segment;
determine multiple second segment maneuvers each moving the motor vehicle between a respective pair of the start lane segment, goal lane segment, and/or second lane segments;

determine multiple second cost values each corresponding to a respective one of the second segment maneuvers;

calculate a first criticality value as criticality(x)=cost(y)+D−C, where criticality(x) is a criticality value of the at least one of the first segment maneuvers x corresponding to the at least one of the cost values cost(x); cost(y) is a respective one of the second cost values corresponding to a second segment maneuver y; C is a first sum of all of the first cost values of the first segment maneuvers after the first segment maneuver x; and D is a second sum of all of the second cost values of the second segment maneuvers after the segment maneuver y;

determine if at least one of the first cost values corresponding to at least one of the first segment maneuvers is greater than the first criticality value; and responsive to the at least one of the first cost values not being greater than the first criticality value, transmit a first command signal to a resident vehicle subsystem to execute a first control operation associated with taking the first predicted route.

14. The motor vehicle of claim 13, wherein the vehicle controller is further programmed to:

determine a third predicted route including multiple third lane segments connecting the start lane segment to the goal lane segment;

determine multiple third segment maneuvers each moving the motor vehicle between a respective pair of the start lane segment, goal lane segment, and/or third lane segments;

determine multiple third cost values each corresponding to a respective one of the third second segment maneuvers; and determine the first criticality value based on cost values from the first cost values, the second cost values, and the third cost values.

15. The motor vehicle of claim 14, wherein the vehicle controller is further programmed to:

responsive to the at least one of the first cost values being greater than the first criticality value, determine if at least one of the second cost values corresponding to at least one of the second segment maneuvers is greater than a second criticality value; and responsive to the at least one of the second cost values being greater than the second criticality value, transmit a third command signal to the resident vehicle subsystem to execute a third driving operation associated with taking the third predicted route.

16. The motor vehicle of claim 14, wherein determining the multiple first cost values includes:

determining a respective plurality of finite steps for the motor vehicle to complete each of the first segment maneuvers; and determining a respective finite cost value for each of the finite steps, wherein the first cost value for a respective one of the first segment maneuvers is a sum of the finite cost values for the respective plurality of finite steps corresponding to the first segment maneuver.

17. The motor vehicle of claim 13, wherein the vehicle controller is further programmed to transmit, responsive to the at least one of the first cost values being greater than the first criticality value, a second command signal to the resident vehicle subsystem to execute a second driving operation associated with taking the second predicted route.

18. The motor vehicle of claim 13, wherein:

determining the first predicted route includes generating a nodal diagram with each of the first lane segments represented as a respective node; and determining the first segment maneuvers includes representing each of the first segment maneuvers as a respective connector linking the respective pair of lane segments.

19. The motor vehicle of claim 13, wherein the resident vehicle subsystem includes an autonomous driving control module operable to automate driving of the motor vehicle, the first control operation including automating driving of the motor vehicle to complete the first predicted route to drive the motor vehicle from the start lane segment to the goal lane segment.

20. The motor vehicle of claim 13, wherein the resident vehicle subsystem includes an Advanced Driver Assistance System control module operable to automate driving of the motor vehicle, the first control operation including executing a driving of maneuver to complete at least a portion of the first predicted route.

* * * * *